United States Patent [19]

Ujiie

[11] 3,785,429

[45] Jan. 15, 1974

[54] APPARATUS FOR THE MANUFACTURE OF CIRCULAR PRODUCTS

[75] Inventor: Akira Ujiie, Hyogo, Japan

[73] Assignee: Mitsubishi Jukogyo Kabushiki Kaisha, Tokyo, Japan

[22] Filed: May 5, 1971

[21] Appl. No.: 140,326

[30] Foreign Application Priority Data
May 18, 1970  Japan.................................. 45-42235

[52] U.S. Cl................. 164/282, 164/136, 164/252, 164/85
[51] Int. Cl........................................... B22d 27/02
[58] Field of Search ................... 164/52, 82, 85, 87, 164/88, 136, 252, 273, 276, 282; 264/310; 219/126, 76

[56] References Cited
UNITED STATES PATENTS

| 3,558,846 | 1/1971 | Ujiie ................................. 164/88 X |
| 1,918,127 | 7/1933 | Pfeiffer .......................... 264/310 X |
| 3,478,810 | 11/1969 | Carton ................................. 164/87 |
| 395,684 | 1/1889 | Baker................................. 164/87 X |
| 2,813,190 | 11/1957 | Felmley ............................. 219/76 |
| 2,937,422 | 5/1960 | Bohme......................... 219/126 UX |

FOREIGN PATENTS OR APPLICATIONS

| 54,778 | 3/1967 | Germany.......................... 164/273 R |
| 182,819 | 8/1966 | U.S.S.R................................ 219/76 |

Primary Examiner—J. Spencer Overholser
Assistant Examiner—John E. Roethel
Attorney—Toren & McGeady

[57] ABSTRACT

An apparatus for the manufacture of circular products in which deposited metal melted by electroslag remelting process is successively drawn out of a retainer for keeping a molten slag which melts the filler metal provided at a predetermined location while being solidified and the tip thereof is fixed to a rotary table, provided in an inclined arrangement, at a position out of the center thereof and is returned into said retainer by rotating said rotary table so as to make one complete turn, thus closing a circle to form a circular product.

2 Claims, 4 Drawing Figures

PATENTED JAN 15 1974 3,785,429

INVENTOR.
AKIRA UJIIE
BY Toren and McGeady
ATTORNEYS

APPARATUS FOR THE MANUFACTURE OF CIRCULAR PRODUCTS

This invention relates to a method and apparatus for the manufacture of products of circular shape or ring-shaped products (referred to as "circular products" hereinafter) by electroslog remelting process.

Hitherto, circular products such as flanges or the like have been manufactured by forging in a single process or manufactured in two processes of bending bar-shaped material and welding it. However, flanges widely vary in material and sizes, and therefore some difficulties have been experienced in obtaining forging material. Moreover, it is costly to prepare compound dies in conformity with the sizes of products to be manufactured. Furthermore, if products to be manufactured are of large size, large forging equipment is required. The use of separate dies for the manufacture of such large products not only is troublesome but also increases the manufacturing cost. The same disadvantages are encountered in casting. Moreover, in the case of casting, blowholes or other defects typical of casting are formed, and therefore the casting method has not come into wide use.

In view of the above-described disadvantages of conventional methods, the object of this invention is to provide a novel method and a novel apparatus for the manufacture of circular products wherein high-quality, defect-free products can be easily manufactured from easily obtainable material. Broadly, this invention resides in providing a method for the manufacture of circular products in which deposited metal melted by electroslag remelting process is successively drawn out of a retainer while being solidified and the tip thereof is turned around within an inclined plane to be returned into said retainer so as to close a circle, thus forming a circular product. Furthermore, this invention resides in providing an apparatus for manufacturing circular products which comprises a rotary table provided in an appropriately inclined arrangement, a retainer provided above the upper surface of said rotary table at a position out of the center thereof and secured to a member other than said rotary table, the bottom portion of said retainer being inclined by the same angle as the rotary table, an inclined opening of the same cross section as that of a circular product to be formed being provided under the front wall of said retainer, the rear wall of said retainer being opened so as to receive the tip of the circular product which is returned thereto after being turned around, and a means for fixing the tip of the circular product to said rotary table at a position out of the center thereof.

Further objects and advantages of this invention will become apparent from the following detailed description in conjunction with the accompanying drawings in which.

Figure 1:
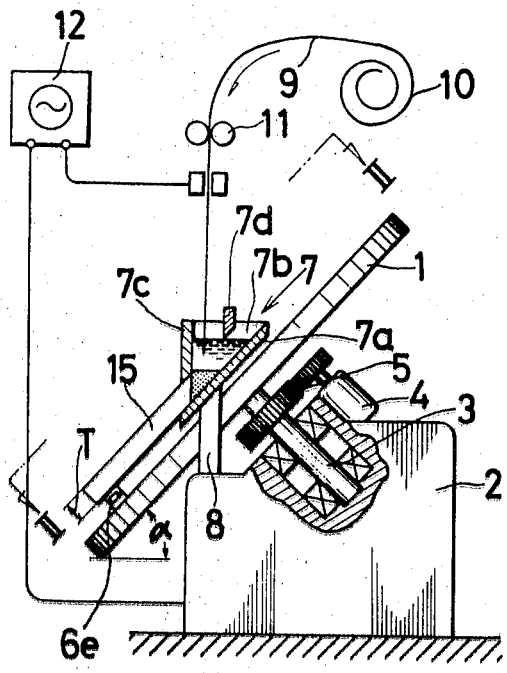
FIG. 1 is a side view of an embodiment of the apparatus for manufacturing circular products according to this invention.

Referring to the accompanying drawings, reference numeral 1 identifies a disk-shaped rotary table which is rotatably supported on a base 2 by means of a shaft 3 in an arrangement inclined by an angle $\alpha$. Reference numeral 4 designates a motor which is mounted on the base 2 to rotate the shaft 3 through a pair of gears 5. Reference numeral 6 identifies a starting block which is secured by a fixing member 6e onto the upper surface of the rotary table 1 at a position out of the center thereof. Said starting block 6 has a width W and a thickness T which are equal to those of a circular product to be formed. Moreover, said starting block 6 is made into the same shape as a part of a circular product. Both end surfaces 6a and 6b of the starting block 6 are inclined with respect to a bottom surface 6c thereof by an angle $\beta$ which is the supplementary angle of said angle $\alpha$. Consequently, a plane having a height H in the vertical direction is defined by both end surfaces 6a and 6b. Reference numeral 7 designates a retainer which is provided over the rotary table 1 at the position out of the center thereof on the horizontal diametral line and is secured to the base 2 by means of a supporting leg 8. Said retainer 7 consists of a bottom plate 7a, both lateral walls 7b, 7b, a front wall 7c and a rear wall 7d. All of said retainer walls are made of a metal such as copper on which molten metal hardly deposits. The bottom wall 7a is inclined by the same angle as the rotary table 1. The lateral walls 7b, 7b are spaced from each other by a distance corresponding to the width W of a circular product. A lower end 7'c of said front wall 7c is inclined by the same angle as the rotary table 1 and is spaced from the bottom wall 7a by the distance T. Thus, an inclined opening 7e having the width W and the height H is formed under the front wall 7c. A lower end 7'd of the rear wall 7d is also inclined in the same manner as described above and is spaced from the bottom wall 7a by the distance H. Said front wall 7c and the rear wall 7d are detachably provided. Reference numeral 9 identifies a wire to be fed from a reel 10 through a feed roller 11. Reference numeral 12 designates a welding source, 13 a molten slag bath, 14 a molten metal, and 15 a part of a circular product formed as a result of the solidification of the molten metal. The portion R indicated in imaginary line identifies a circular product to be manufactured. Such metals as steel, steel alloys, aluminum or aluminum alloys which can cause electroslag melting phenomenon may be used as the wire 9.

Figure 3:
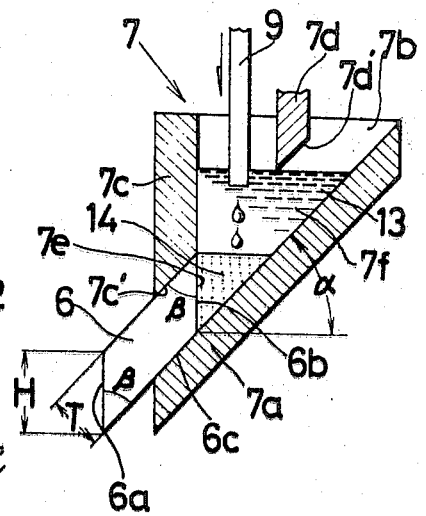
FIG. 3 illustrates the condition when the manufacturing operation is started.
Figure 2:
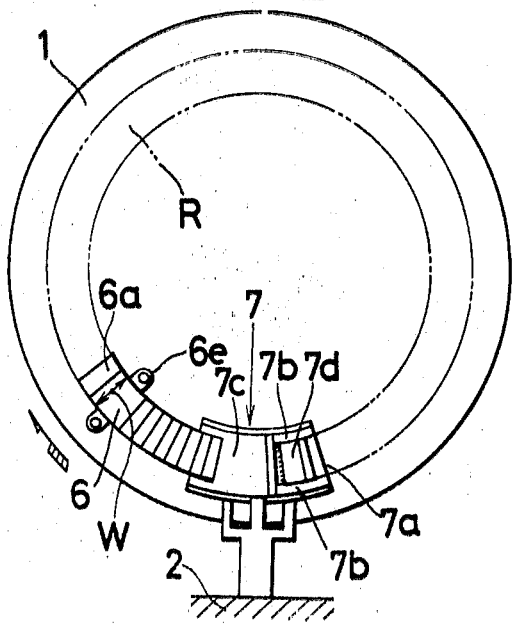
FIG. 2 is a view taken along the line II—II of FIG. 1.

In starting the operation of the apparatus described above, the starting block 6 is positioned so that the end surface 6b thereof fills the opening 7e formed under the front wall 7c, as shown in FIG. 3. As a result, a molten pool retainer space 7f having an inclined bottom is formed by the bottom wall 7a, both lateral walls 7b, 7b and the front wall 7c. When the molten slag bath 13 is produced in said retainer space 7f and the power source 12 is turned on while the wire 9 is being fed at a certain constant speed, the electroslag melting phenomenon is caused in said retainer space 7f, thus producing the molten metal 14. Particles of the molten metal starts to form a triangle pole having a triangular vertical cross section, when viewed from the lateral side. When said triangle grows larger and the height of the base of the triangle pole becomes equal to that of the rear end surface 6b of the starting block 6, the rotary table 1 is put into rotation. The rotating speed of the rotary table 1 at that time depends on the melting rate of the wire 9. The rotary table 1 is rotated by adjusting the rotating speed so that the height of the base of the triangle pole of the molten metal is always held equal to the height H of the inclined end surface of the starting block 6. Thus, the starting block 6 is rotated with the rotary table 1, because the former is secured to the latter. At the same time, the end 6b of the starting block 6 pulls out the solidified molten metal 15. At this time, the molten metal 14 is mostly cooled by the front wall 7c and the bottom wall 7a. It is needless to say that the rotating speed of the rotary table 1 should be controlled so that the molten metal 14 is cooled when it passes by the inner surfaces of said retainer walls. Said cooling may be effected by admitting a coolant into said walls 7c and 7a.

Figure 4:
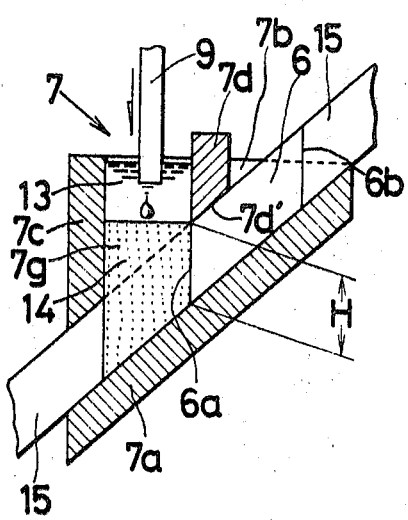
FIG. 4 illustrates the condition when the manufacturing operation is completed.

The successively solidified metal 15 is pulled out by the starting block 6 to form a circular product. When the front end of the starting block 6 is brought into contact with rear wall 7d, the front end surface 6a of the starting block 6 fills the space under the rear wall 7d as shown in FIG. 4, thus forming a space 7g of trapezoidal cross section. At this time, the rotation of the rotary table 1 is stopped, while melting is continued. Melting is continued until the height of the rear end of the molten metal becomes equal to H in the space 7g of trapezoidal cross section. Thus, the molten metal of trapezoidal shape is formed as shown in FIG. 4. When said molten metal is obtained, melting is stopped. In this way, a circular product R made of molten metal only is produced. Said circular product R is withdrawn by removing the front wall 7c and the rear wall 7d.

As described above, a closed circuit product is obtained by successively forming its parts by means of the rotary table 1 and the retainer 7 which are inclined by the angle $\alpha$. Said angle $\alpha$ may be appropriately selected, but should be preferably 45° or so, the reason for which is described below.

In case when the rotary table 1 is horizontally installed, the molten metal 14 should be level with the surface of an product to be pulled out while being solidified. If the level of the molten metal 14 rises above the opening 7e under the front wall 7c, the product is caught by the front wall 7c and cannot be withdrawn. If the level of the molten metal 14 decreases below the opening 7e, the upper surface thereof is not cooled as in the case when the wall 7c is not provided. Therefore, the molten pool flows from the opening 7e in the left direction in FIG. 3, as a result of which products of a predetermined thickness cannot be obtained. To put it briefly, it is almost impossible to maintain the molten pool on a level with the lower end of the front wall 7c in case when the rotary table 1 is horizontally installed. On the contrary, if the angle of inclination of the rotary table 1 approaches 90°, the space between the front wall 7c and the rear wall 7d is decreased, and therefore the volume of the slag bath will be decreased unless the depth thereof is increased. Moreover, as the level of the molten pool must be below the lower end of the front wall in the same manner as in the case when the angle of inclination is zero, the slag melting will have to be accomplished by using a narrow and deep slag bath. Consequently, the operational condition becomes worse and production efficiency is decreased. Therefore, the rotary table 1 according to this invention is adapted to be inclined in the range from a small angle almost horizontal, for example, about 5° to about 80°. The most preferred angle is about 45°. In brief, according to this invention, circular products of any appropriate dimensions can be produced from electroslag melt only. Moreover, flat bars which can be produced in large quantities at a low cost are used as an electrode. Therefore, this invention ensures the manufacture of high quality products. Moreover, the apparatus according to this invention does not require any compound dies, but requires separate dies only. Thus, this invention is quite advantageous in manufacturing circular products at a low installation cost and a low manufacturing cost.

What is claimed is:

1. An apparatus for manufacturing circular products which comprises a rotary table provided in an appropriately inclined arrangement, a retainer provided above the upper surface of said rotary table at a position out of the center of thereof and secured to a member other than said rotary table, the bottom portion of said retainer being inclined by the same angle as the rotary table, an inclined opening of the same cross section as that of a circular product to be formed being provided under the front wall of said retainer, the rear wall of said retainer being disposed so as to receive the tip of the circular product which is returned thereto after being turned around, and means for fixing the tip of the circular product to said rotary table at a position out of the center thereof.

2. The apparatus set forth in claim 1 wherein said rotary table is provided in an arrangement inclined in the range from a small angle almost horizontal to about 80°.

* * * * *